United States Patent
Izumi

(10) Patent No.: US 8,275,503 B2
(45) Date of Patent: Sep. 25, 2012

(54) VEHICLE AND CONTROL METHOD OF VEHICLE

(75) Inventor: Kazunari Izumi, Anjo (JP)

(73) Assignees: Toyota Jidosha Kabushiki Kaisha, Toyota-shi (JP); Denso Corporation, Kariya (JP)

(*) Notice: Subject to any disclaimer, the term of this patent is extended or adjusted under 35 U.S.C. 154(b) by 437 days.

(21) Appl. No.: 12/615,053

(22) Filed: Nov. 9, 2009

(65) Prior Publication Data

US 2010/0121515 A1 May 13, 2010

(30) Foreign Application Priority Data

Nov. 7, 2008 (JP) ................................. 2008-286902

(51) Int. Cl.
*B60T 8/00* (2006.01)

(52) U.S. Cl. .......................................... 701/22; 303/192

(58) Field of Classification Search .................... 701/22, 701/70, 78, 80, 36, 48, 69; 303/154, 20, 303/155, 192, 112, 191; 180/65.1, 243, 165; 477/92, 170, 174, 182
See application file for complete search history.

(56) References Cited

U.S. PATENT DOCUMENTS 5,171,069 A * 12/1992 Peck et al. .................... 303/127
6,089,679 A * 7/2000 Kushi et al. ................. 303/113.5

FOREIGN PATENT DOCUMENTS

| JP | 06-261416 A | 9/1994 |
|---|---|---|
| JP | 2005-067603 A | 3/2005 |
| JP | 2007-055434 A | 3/2007 |
| JP | 2007-329982 A | 12/2007 |
| JP | 2008-265616 A | 11/2008 |

OTHER PUBLICATIONS

Office Action issued Jul. 3, 2012 in JP 2008-286902 and English translation thereof.

* cited by examiner

*Primary Examiner* — Dalena Tran
(74) *Attorney, Agent, or Firm* — Kenyon & Kenyon LLP

(57) ABSTRACT

A vehicle includes: an electric motor that outputs power to a drive shaft that is coupled to a first wheel, which is a primary drive wheel; an electrical storage device that exchanges electrical power with the electric motor; a braking system that can independently apply a braking force to the first wheel and a second wheel that is a free rolling wheel or a drive wheel other than the first wheel, regardless of a braking request by a driver; and a control unit that controls the braking system and the electric motor such that the braking system applies the braking force only to the second wheel and that output torque of the electric motor becomes equal to or lower than specified torque until rotational speed of the electric motor reach specified revolution when a start-up request is made by the driver while the vehicle is at a halt on a driving road surface whose inclination, which is acquired by an inclination acquisition device, is larger than or equal to specified inclination. The present invention also relates to a control method of the vehicle.

9 Claims, 5 Drawing Sheets

VEHICLE AND CONTROL METHOD OF VEHICLE

INCORPORATION BY REFERENCE

The disclosure of Japanese Patent Application No. 2008-286902 filed on Nov. 7, 2008 including the specification, drawings and abstract is incorporated herein by reference in its entirety.

BACKGROUND OF THE PRESENT INVENTION

1. Field of the Present Invention

The present invention relates to a vehicle equipped with an electric motor that can output power to a drive shaft that is coupled to a drive wheel. The present invention also relates to a control method of the vehicle.

2. Description of the Related Art

A conventional electric vehicle has been known to determine if a driving motor is locked. When it is determined that the motor is locked, a driving force of the motor is set to a limited value that is lower than a normal value that corresponds to a required driving force. When it is determined that the motor lock is canceled, the driving force is returned to the normal value (see Japanese Patent Application Publication No. 2007-329982 (JP-A-2007-329982), for example). This electric vehicle is designed to have a smaller rate of change of a driving force in proportion to lower inclination of a road surface when the driving force of the motor is returned from the limited value to the normal value, thereby suppressing fluctuation in driving torque upon vehicle start-up. Meanwhile, the electric vehicle is also designed such that the rate of change of the driving force is reduced inversely with an increase in inclination of the road surface, when the driving force of the motor is changed from the normal value to the limited value. Thus, it is possible to maintain a constant distance of rearward movement of the vehicle regardless of the inclination of the road surface when it is determined that the motor is locked.

However, as in the above conventional electric motor, even if the rate of change of driving force is reduced inversely with the increase in inclination of the road surface, when the driving force of the motor is changed from the normal value to the limited value, the vehicle moves rearward to a certain degree at hill start, apart from the intention of a driver. Consequently, it is difficult to prevent passengers from feeling a sense of discomfort.

SUMMARY OF THE PRESENT INVENTION

In view of the above problem, the present invention provides a vehicle that suppresses rearward movement of the vehicle that tends to occur at hill start, and also provides a control method of the vehicle.

According to an aspect of the present invention, the vehicle includes: an electric motor that can output power to a drive shaft that is coupled to a first wheel, which is a primary drive wheel; an electrical storage device that can exchange electrical power with the electric motor; a braking system that independently applies a braking force to the first wheel and a second wheel that is a free rolling wheel or a drive wheel other than the first wheel, regardless of a braking request by a driver; an inclination acquisition device that acquires inclination of a driving road surface; and a control unit. The control unit controls the braking system and the electric motor such that the braking system applies the braking force only to the second wheel and that output torque of the electric motor becomes equal to or lower than specified torque until rotational speed of the electric motor reaches specified rotational speed when a start-up request is made by a driver while the vehicle is at a halt on a driving road surface whose inclination, which is acquired by the inclination acquisition device, is larger than or equal to specified inclination.

According to the above vehicle, when the start-up request is made by the driver while the vehicle is at a halt on the driving road surface whose inclination is larger than or equal to the specified inclination, the electric motor and the braking system are controlled such that the braking system applies the braking force only to the second wheel and that the output torque of the electric motor becomes equal to or lower than the specified torque until the rotational speed of the electric motor reaches the specified rotational speed. As described above, the braking force is applied only to the second wheel that is the free rolling wheel or the drive wheel other than the primary drive wheel at hill start of the vehicle, that is, when the vehicle starts moving forward on an uphill road or rearward on a downhill road. This allows rotation of the first wheel, which is the primary drive wheel, or rotation of the electric motor, while the vehicle remains at a halt or moves slightly rearward to a degree that does not give a sense of discomfort to the passengers. Therefore, even when the output torque of the electric motor is limited to be equal to or lower than the specified torque in order to prevent heat generation in the electric motor and the like, it is possible to further reduce a distance of the rearward movement of the vehicle and to cancel a locked state of the electric motor. Thus, the vehicle can start moving smoothly.

In the vehicle, the specified torque may be a value that is equal to or lower than maximum torque that can be output from the electric motor when the rotation of the electric motor is stopped.

Furthermore, the control unit may control the braking system such that the braking system stops applying the braking force to the second wheel when the rotational speed of the electric motor reaches the specified rotational speed. Accordingly, the vehicle can start moving smoothly at hill start.

The control unit may control the braking system such that the braking system applies the braking force to the second wheel when the vehicle comes to a halt, without the braking request by the driver, on the driving road surface whose inclination, which is acquired by the inclination acquisition device, is equal to or larger than the specified inclination. As described above, the braking force is applied to the second wheel in advance when the vehicle comes to a halt on a slope road due to so-called acceleration hold. Accordingly, it is: to preferably reduce the distance of the rearward movement of the vehicle when the vehicle starts moving afterward.

The vehicle may further include: an internal combustion engine that outputs power; a second electric motor that can input and output power and exchange electrical power with the electrical storage device; and a triaxial power input/output device. The triaxial power input/output device is connected to three shafts including the drive shaft, an output shaft of the internal combustion engine, and a rotational shaft of the second electric motor. Based on power that is input to or output from any two of the three shafts, the triaxial power input/output device inputs or outputs power to/from a remaining shaft.

Another aspect of the present invention is a control method of a vehicle that includes: an electric motor that can output power to a drive shaft that is coupled to a first wheel, which is a primary drive wheel; an electrical storage device that can exchange electrical power with the electric motor; and a braking system that can independently apply a braking force to the first wheel and a second wheel that is a free rolling wheel or a drive wheel other than the first wheel, regardless of a braking request by a driver. The control method of a vehicle includes: controlling the braking system and the electric motor such that the braking system applies the braking force only to the second wheel and that output torque of the electric motor becomes equal to or lower than specified torque until rotational speed of the electric motor reaches specified rotational speed, when a start-up request is made by a driver while the vehicle is at a halt on a driving road surface whose inclination is larger than or equal to specified inclination.

According to the control method as described above, the braking force is applied only to the second wheel that is the free rolling wheel or the drive wheel other than a primary drive wheel, at hill start of the vehicle, that is, when the vehicle starts moving forward on an uphill road or rearward on a downhill road. This allows rotation of the first wheel, which is the primary drive wheel, or rotation of the electric motor, while the vehicle remains at a halt or moves slightly rearward to a degree that does not give a sense of discomfort to the passengers. Therefore, even when the output torque of the electric motor is limited to be equal to or lower than the specified torque in order to prevent heat generation in the electric motor and the like, it is possible to further reduce a distance of rearward movement of the vehicle and to cancel a locked state of the electric motor. Thus, the vehicle can start moving smoothly.

BRIEF DESCRIPTION OF THE DRAWINGS

The features, advantages, and technical and industrial significance of this invention will be described in the following detailed description of example embodiments of the present invention with reference to the accompanying drawings, in which like numerals denote like elements, and wherein.

DETAILED DESCRIPTION OF EMBODIMENTS

Next, a best mode for carrying out the invention will be described with use of an embodiment described below.

Figure 1:
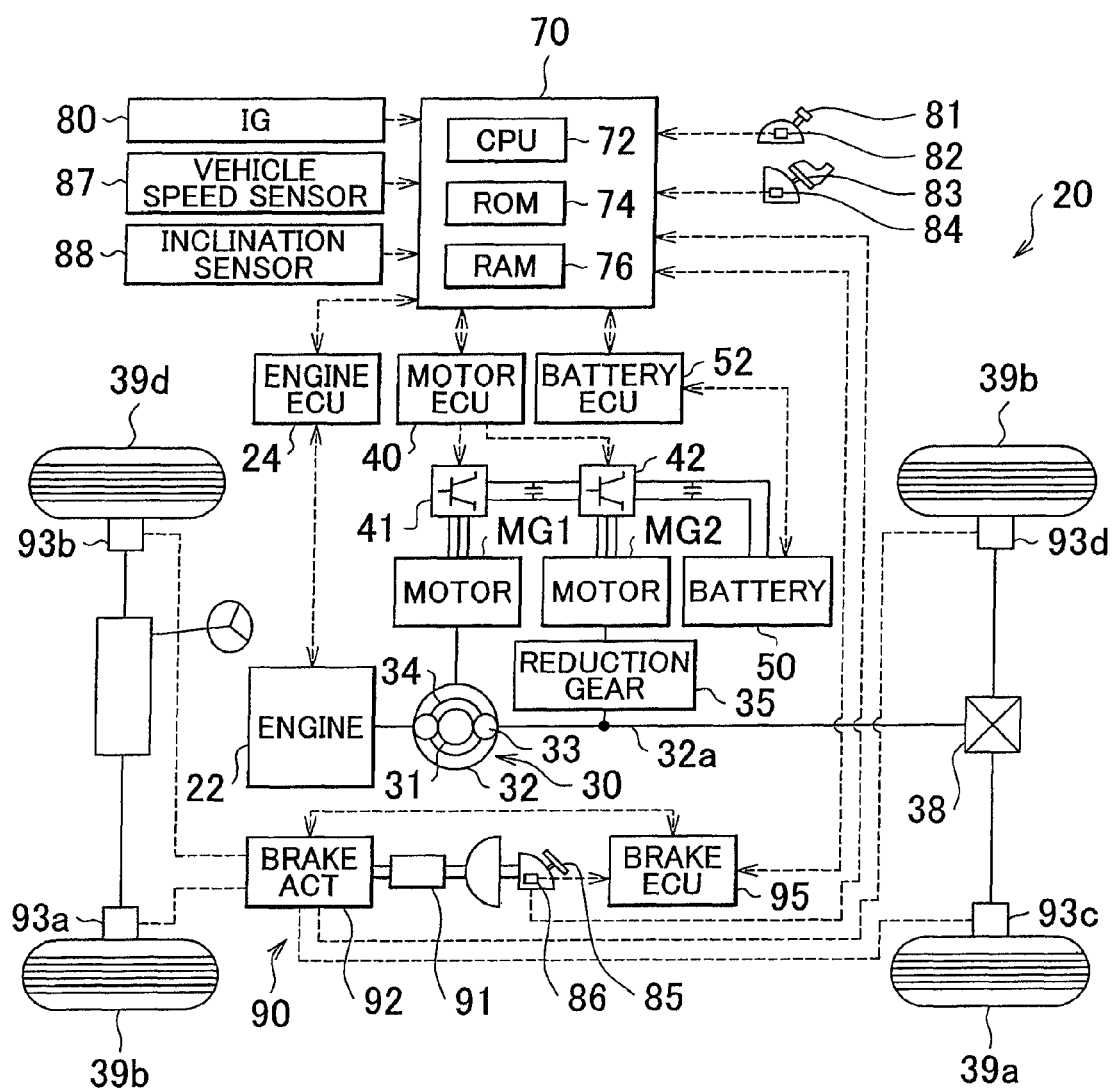
FIG. 1 shows general configuration of a hybrid vehicle 20 as a vehicle according to an embodiment of the present invention.

FIG. 1 shows general configuration of a hybrid vehicle 20 as a vehicle according to the embodiment of the present invention. The hybrid vehicle 20 shown in FIG. 1 includes: an engine 22; a triaxial power distribution/integration mechanism 30 that is connected to a crankshaft (output shaft) 26 of the engine 22 through a damper (not shown); a motor MG1 that is connected to the power distribution/integration mechanism 30 and can generate electrical power; a reduction gear 35 that is attached to a ring gear shaft 32a, which is an axle connected to the power distribution/integration mechanism 30; a motor MG2 that is mechanically connected to the ring gear shaft 32a through the reduction gear 35; an electronically-controlled hydraulic brake unit (hereinafter simply referred to as "brake unit") 90, which is a braking system that can produce a frictional braking force; an electronic control unit for hybrid system (hereinafter referred to as "hybrid ECU") 70 that controls the entire hybrid vehicle 20.

The engine 22 is an internal combustion engine that is supplied with hydrocarbon fuel such as gasoline and diesel fuel to output power, and is controlled by an electronic control unit for an engine (hereinafter referred to as "engine ECU") 24 for an fuel injection amount, ignition timing, an intake air amount, and the like. The engine ECU 24 receives signals from various sensors that are provided for the engine 22 to detect an operating state of the engine 22. The engine ECU 24 communicates with the hybrid ECU 70, controls the operation of the engine 22 based on the signals from the above sensors including a control signal from the hybrid ECU 70, and outputs data related to the operating state of the engine 22 to the hybrid ECU 70 as required.

The power distribution/integration mechanism 30 includes: a sun gear 31 as an external gear; a ring gear 32 as an internal gear that is arranged concentrically with the sun gear 31; a plurality of pinion gears 33 that mesh with the sun gear 31 and also mesh with the ring gear 32; and a carrier 34 that holds the plurality of pinion gears 33 in such a manner that allows the pinion gears 33 to both revolve and rotate on their own axes. The power distribution/integration mechanism 30 is a planetary gear mechanism that attains differential actions with the sun gear 31, the ring gear 32, and the carrier 34 as rotational elements. The carrier 34 as the rotational element on the engine side is connected to the crankshaft 26 of the engine 22. The sun gear 31 is connected to the motor MG1. The ring gear 32 as the rotational element on the axle side is connected to the reduction gear 35 through the ring gear shaft 32a. When the motor MG1 functions as a generator, the power distribution/integration mechanism 30 distributes power from the engine 22 through the carrier 34 into the sun gear 31 side and the ring gear 32 side in accordance with a gear ratio. When the motor MG1 functions as an electric motor, the power distribution/integration mechanism 30 integrates power from the engine 22 through the carrier 34 with power from the motor MG1 through the sun gear 31, and outputs the integrated power to the ring gear 32 side. The power output to the ring gear 32 is eventually output to wheels 39a and 39b (rear wheels in the embodiment), which are drive wheels (primary drive wheels), from the ring gear shaft 32a through a differential gear 38.

Both the motor MG1 and the motor MG2 function as a generator and are known PM-type synchronous generator-motors that can operate as electric motors. Each of the motor MG1 and the motor MG2 has a rotor, whose outer peripheral surface is fixed with a permanent magnet, and a stator around which a three-phase coil is wound. The motors MG1 and MG2 exchange electrical power with a battery 50, which is a secondary battery, through inverters 41 and 42 that have six switching elements and can convert DC electrical power to pseudo three-phase AC electrical power. A power line that connects the inverters 41 and 42 with the battery 50 includes a positive bus line and a negative bus line that are shared by the inverters 41 and 42, thus allowing electrical power generated by either one of the motors MG1 and MG2 to be consumed by the other. Accordingly, the battery 50 charges electrical power that is generated by either one of the motors MG1 and MG2, and discharges electrical power to offset a shortage. If the battery 50 balances out generation and consumption of electrical power with the motors MG1 and MG2, the battery 50 does not charge or discharge electrical power. Drives of both the motors MG1 and MG2 are controlled by an electronic control unit for a motor (hereinafter, referred to as "motor ECU") 40. The motor ECU 40 receives signals that are required to control the drives of the motors MG1 and MG2, such as signals from rotational position detecting sensors (not shown) that are provided to the rotors in the motors MG1 and MG2, and signals indicative of phase currents that are applied to the motors MG1 and MG2 and detected by current sensors (not shown). The motor ECU 40 outputs a switching control signal to the inverters 41 and 42, and the like. The motor ECU 40 also executes a rotational speed calculation routine (not shown) based on the signals received from the rotational position detecting sensors so as to calculate rotational speed Nm1 and Nm2 of the rotors in the motors MG1 and MG2. Furthermore, the motor ECU 40 communicates with the hybrid ECU 70. The motor ECU 40 controls the drives of the motors MG1 and MG2 in accordance with control signals from the hybrid ECU 70 and also outputs data related to operating states of the motors MG1 and MG2 to the hybrid ECU 70 as required.

The battery 50 is managed by an electronic control unit for a battery (hereinafter, referred to as "battery ECU") 52. The battery ECU 52 receives signals that are required to manage the battery 50, such as a signal indicative of a battery voltage from a voltage sensor (not shown) that is disposed between terminals of the battery 50, a signal indicative of charge/discharge current from an current sensor (not shown) that is attached to the power line connected to an output terminal of the battery 50, and a signal indicative of a battery temperature from a temperature sensor (not shown) that is attached to the battery 50. As required, the battery ECU 52 outputs data related to the state of the battery 50 to the hybrid ECU 70 and the engine ECU 24 via communication. Furthermore, the battery ECU 52 calculates: a residual capacity, i.e. state of charge (SOC) on the basis of an integrated value of the charge/discharge current that is detected by the current sensor so as to manage the battery 50; charge/discharge required power Pb* of the battery 50 on the basis of the residual capacity SOC; and an input limit Win and an output limit Wout based on the residual capacity SOC and a battery temperature Tb. The input limit Win is charge allowable electrical power that is permitted to charge the battery 50. The output limit Wout is discharge allowable electrical power that is permitted to discharge the battery 50.

The brake unit 90 includes: a master cylinder 91; a brake actuator 92 of a fluid pressure type (hydraulic type); wheel cylinders 93a to 93d that drive brake pads that can sandwich a brake disc attached to each of the wheels 39a to 39d and apply a frictional braking force to the corresponding wheel; a wheel-cylinder pressure sensor (not shown) that is provided to each of the wheel cylinders 93a to 93d and detects hydraulic pressure (wheel cylinder pressure) of the corresponding wheel cylinder; and an electric control unit for a brake (hereinafter referred to as "brake ECU") 95 that controls the brake actuator 92. The brake actuator 92 has: a pump and an accumulator, which are hydraulic pressure generation sources (not shown); a master cylinder cut solenoid valve that controls communications between the master cylinder 91 and the wheel cylinders 93a to 93d; and a stroke simulator that creates a reactive force against a brake pedal force in accordance with an operation amount of the brake pedal 85. The brake ECU 95 receives through signal lines (not shown) signals indicative of pressure of the master cylinder from a master cylinder pressure sensor (not shown) that detects pressure of the master cylinder, pressure of the wheel cylinder from a wheel cylinder pressure sensor, a wheel speed from a wheel speed sensor (not shown) that detects a wheel speed of each of the wheels 39a to 39d, and a steering angle from a steering angle sensor (not shown), and exchanges various signals with the hybrid ECU 70 and the like via communication. Then, based on a brake pedal stoke BS that indicates the operation amount of the brake pedal 85, a vehicle speed V, and the like, the brake ECU 95 controls the brake actuator 92 such that, of braking torque that should act on the hybrid vehicle 20, frictional braking torque that corresponds to an distributed amount of the braking torque to the brake unit 90 acts on the wheels 39a to 39d. In addition, the brake ECU 95 can control the brake actuator 92 such that the braking torque acts independently on each of the wheels 39a to 39d, irrespective of the operation of the brake pedal 85 by a driver. Furthermore, the brake ECU 95 can execute so-called anti lock brake system (ABS) control, traction control (TRC), vehicle stabilizing control (VSC), and the like on the basis of various parameters such as rotational speed of a wheel, acceleration in a longitudinal direction and a lateral direction of the vehicle, a yaw rate, and a steering angle that are detected by sensors (not shown).

The hybrid ECU 70 is a microprocessor that is configured mainly by a CPU 72. In addition to the CPU 72, the hybrid ECU 70 includes a ROM 74 that stores processing programs, a RAM 76 that temporarily stores data, input and output ports (not shown), and a communication port (not shown). The hybrid ECU 70 receives through the input ports: an ignition signal from an ignition switch (start switch) 80; a shift position SP from a shift position sensor 82 that detects the shift position SP, which is an operation position of a shift lever 81; an accelerator operation amount Acc from an accelerator pedal position sensor 84 that detects an operation amount of an accelerator pedal 83, which is an accelerator operation amount by the driver; the brake pedal stroke BS from a brake pedal stroke sensor 86 that detects an operation amount of the brake pedal 85; the vehicle speed V from a vehicle speed sensor 87 that obtains the vehicle speed V; inclination of a road surface θ from an inclination sensor 88 that can detects the inclination of the driving road surface; and the like. As described above, the hybrid ECU 70 is connected to the engine ECU 24, the motor ECU 40, the battery ECU 52, the brake ECU 95 and the like via the communication port to exchange various control signals and data with the engine ECU 24, the motor ECU 40, the battery ECU 52, the brake ECU 95, and the like.

In the hybrid vehicle 20 of this embodiment that is configured as described above, based on the accelerator operation amount Acc, which corresponds to the operation amount of the accelerator pedal 83 by the driver, and based on the vehicle speed V, the ECU 70 calculates required torque Tr* to be output to the ring gear shaft 32a, which is a drive shaft coupled to the wheels 39a and 39b as the drive wheels. In order to output the torque that is based on the required torque Tr* to the ring gear shaft 32a, the engine ECU 24 controls the engine 22, and the motor ECU 40 controls the motors MG1 and MG2. Operation control modes of the engine 22 and the motors MG1 and MG2 include a torque converting operation mode, a charge/discharge operation mode, and a motor operation mode. In the torque converting operation mode, the operation of the engine 22 is controlled such that the engine 22 outputs power that corresponds to the required torque Tr*. The drives of the motors MG1 and MG2 are also controlled such that the entire power output from the engine 22 is converted to torque by the power distribution/integration mechanism 30 and the motors MG1 and MG2 and then output to the ring gear shaft 32a. In the charge/discharge operation mode, the operation of the engine 22 is controlled such that the engine 22 outputs power that corresponds to a sum of the required torque Tr* and electric power required for charge/discharge of the battery 50. The drives of the motors MG1 and MG2 are also controlled such that a part or whole of the power output from the engine 22 that is accompanied by the charge/discharge of the battery 50 is converted to torque by the power distribution/integration mechanism 30 and the motors MG1 and MG2 and that torque based on the required torque Tr* is output to the ring gear shaft 32a. In the motor operation mode, the drive of the motor MG2 is controlled such that the operation of the engine 22 is stopped and that the torque based on the required torque Tr* is output to the ring gear shaft 32a.

Description will next be made on the operation of the hybrid vehicle 20 that is configured as described above, and particularly on the operation of the hybrid vehicle 20 when the hybrid vehicle 20 is at a halt and when the accelerator pedal 83 is operated by the driver to make a start-up request. For a purpose of clear and easy understanding of the description, the operation of the hybrid vehicle 20 will be explained with an example in which the engine 22 is deactivated and the driver selects a drive range for forward travel.

Figure 2:
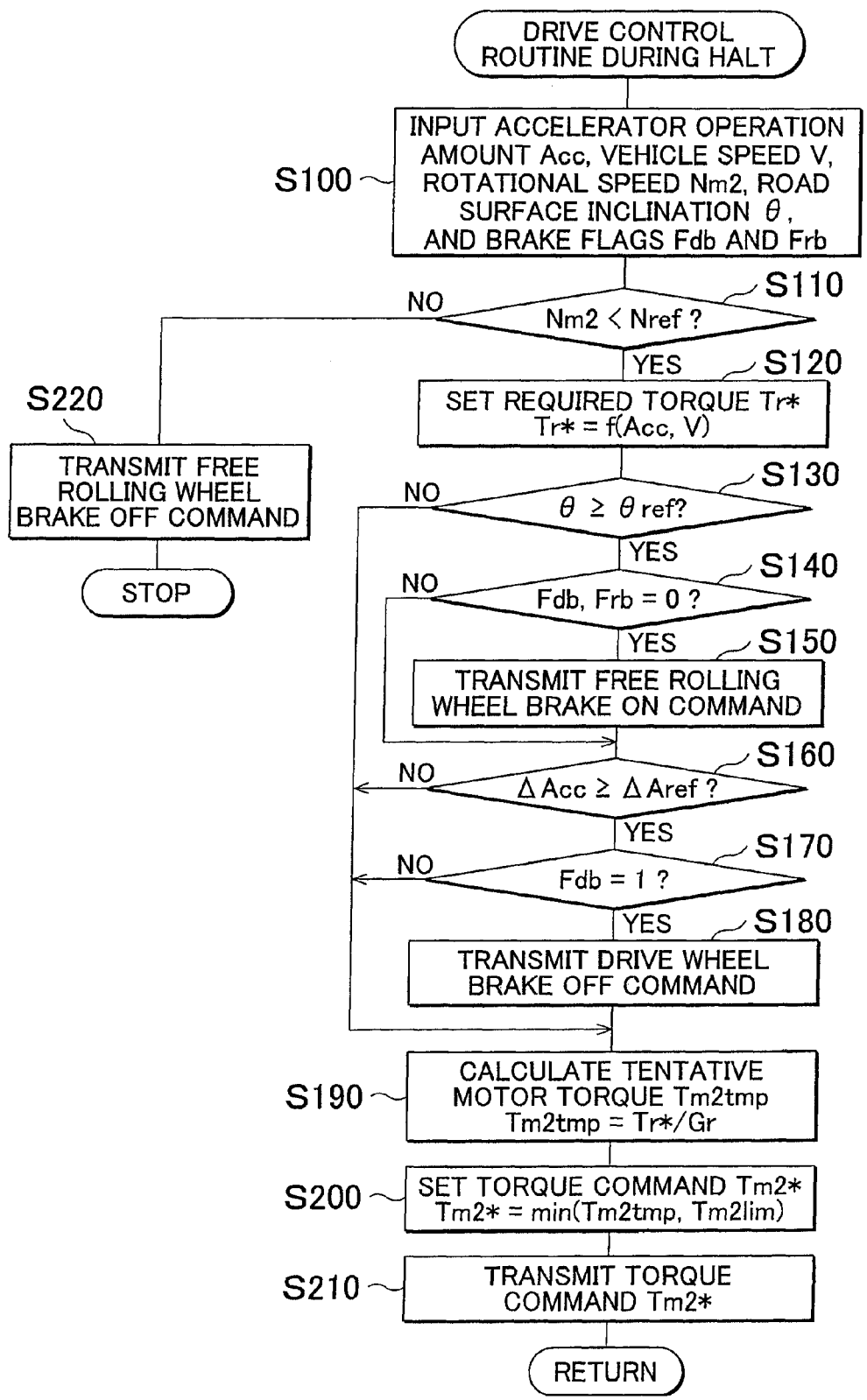
FIG. 2 is a flowchart that shows an example of a drive control routine during a halt that is executed by a hybrid electronic control unit (ECU) 70 according to the embodiment.

FIG. 2 is a flowchart that shows an example of a drive control routine during a halt that is repeatedly executed by the hybrid ECU 70 at specified time intervals after the hybrid vehicle 20 is brought to a halt. Upon initiation of the drive control routine during a halt in FIG. 2, the CPU 72 in the hybrid ECU 70 executes input processes of data that are required for control, such as the accelerator operation amount ACC from the accelerator pedal position sensor 84, the vehicle speed V from the vehicle speed sensor 87, the rotational speed Nm2 of the motor MG2, the road surface inclination θ from the inclination sensor 88, and brake flags Fdb and Frb (step S100). In the step, the rotational speed Nm2 of the motor MG2 are calculated through the rotational speed calculation routine that is executed by the motor ECU 40, and are input from the motor ECU 40 via communication. The brake flags Fdb and Frb are input from the brake ECU 95 via communication. The brake flag Fdb is set to a value 1 when the brake ECU 95 applies the frictional braking torque to the wheels 39a and 39b, which are the drive wheels, by the brake unit 90, and is set to a value 0 when the frictional braking torque is not applied to the wheels 39a and 39b. The brake flag Frb is set to a value 1 when the brake ECU 95 applies the frictional braking torque to the wheels 39c and 39d, which are the free rolling wheels (front wheels in the embodiment), by the brake unit 90, and is set to a value 0 when the frictional braking torque is not applied to the wheels 39c and 39d.

Figure 3:
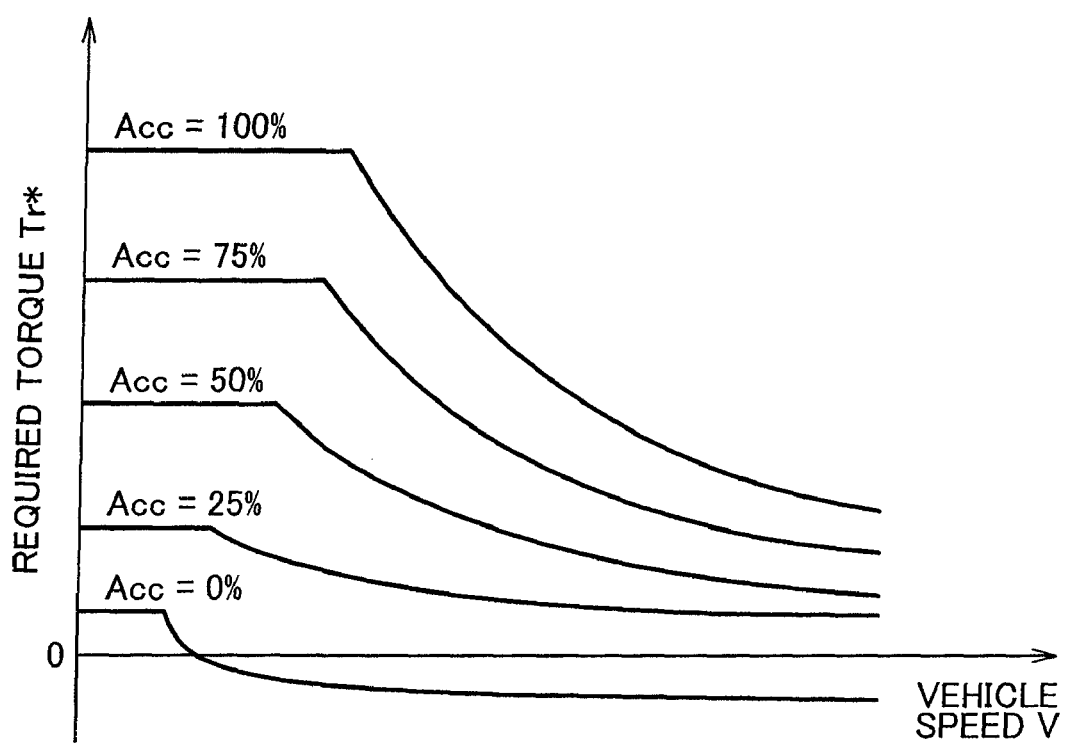
FIG. 3 is an explanatory diagram that shows an example of a required torque setting map for use in the embodiment.

After the data input processes in the step S100, it is determined whether or not the input rotational speed Nm2 of the motor MG2 are lower than reference rotational speed Nref, which is a specified threshold value (step S110). In the embodiment, the reference rotational speed Nref used in the step S110 are set to be a positive value that is relatively close to the value 0 (provided that a rotational direction of the motor MG2, when the hybrid vehicle 20 travels forward, is determined as positive). When it is determined in the step S110 that the rotational speed Nm2 of the motor MG2 are lower than the reference rotational speed Nref, the required torque Tr* is set based on the accelerator operation amount Acc and the vehicle speed V. The required torque Tr* is output to the ring gear shaft 32a that is coupled to the wheels 39a and 39b, which are the drive wheels (step S120). In the embodiment, a relationship among the accelerator operation amount Acc, the vehicle speed V, and the required torque Tr* is predetermined and stored as a required torque setting map in the ROM 74. The required torque Tr* that corresponds to the given accelerator operation amount Acc and the vehicle speed V (basically, the vehicle speed V=0 in the embodiment) is derived and set from the map. An example of the required torque setting map is shown in FIG. 3. Next, it is determined whether or not the road surface inclination θ, which is input in the step S100, is equal to or larger than reference inclination θref that is a specified threshold value (step S130). The reference inclination θref used in the step S120 is predetermined in order to determine whether or not the road surface inclination θ is equal to or larger than the specified value as a road surface being an uphill, that is, to determine whether or not the driving road surface on which the hybrid vehicle 20 is at a halt is the uphill.

When it is determined in the step S130 that the road surface inclination θ is smaller than the reference inclination θref, tentative motor torque Tm2tmp that is a tentative value of torque to be output from the motor MG2 is calculated according to a following equation (1) by using the required torque Tr* and a gear ratio Gr of the reduction gear 35 (step S190). Then, the smaller of the tentative motor torque Tm2tmp and predetermined upper limit torque Tm2lim is set as a torque command Tm2* for the motor MG2 (step S200). The set torque command Tm2* is then transmitted to the motor ECU 40 (step S210), and the processes in the step S100 and after are repeated. The motor ECU 40 that has received the torque command Tm2* executes switching control of the switching elements of the inverter 42 so as to drive the motor MG2 in accordance with the torque command Tm2*. If an attempt is made to output large torque from the motor MG2 when the rotation of the motor MG2 is stopped in conjunction with a halt of the hybrid vehicle 20, the flow of the current concentrates on a particular one of the three-phase coil in the motor MG2. Consequently, there is possible overheat of the motor MG2 and the corresponding inverter 42. In consideration of the above, in the embodiment, a value smaller than the upper limit torque is defined as the upper limit torque Tm2lim so that the heat generation in the motor MG2 and the corresponding inverter 42 falls within an allowable range when the rotation of the motor MG2 is stopped (locked). Then, the torque command Tm2* is set such that torque that is actually output from the motor MG2 becomes equal to or lower than the upper limit torque Tm2lim. In the embodiment, the reference inclination θref is set to be a value closer to inclination in the case that the hybrid vehicle 20 comes to a halt without application of the braking force to the vehicle due to a vehicle weight when the upper limit torque Tm2lim is output from the motor MG2.

$$Tm2tmp = Tr^*/Gr \quad (1)$$

Meanwhile, when it is determined in the step S130 that the road surface inclination θ is larger than or equal to the reference inclination θref, it is determined whether or not the brake flags Fdb and Frb, both of which are input in the step S100, are the value 0. More specifically, it is determined whether or not the frictional braking torque is applied to the wheels 39a and 39b, which are the drive wheels, and to the wheels 39c and 39d, which are the free rotational wheels, by the brake unit 90 (step S140). When it is determined that both of the brake flags Fdb and Frb are the value 0 and thus that the frictional braking torque is not applied to any of the wheels 39a to 39d by the brake unit 90, that is, when the hybrid vehicle 20 is brought to a halt on the uphill due to the acceleration hold, a command signal is transmitted to the brake ECU 95 so that the frictional braking torque is applied to the wheels 39c and 39d, which are the free rolling wheels, by the brake unit 90 (step S150). The brake ECU 95 that has received the command signal transmitted in the step S150 controls the brake actuator 92 such that the frictional braking torque in accordance with the road surface inclination θ, for example, is applied to the wheels 39*c* and 39*d*. When it is determined false in the step S140, the process in the step S150 is skipped.

After the process in the step S140, or after the processes in the steps S140 and S150, it is determined whether or not acceleration operation amount deviation ΔAcc is equal to or larger than specified reference deviation ΔAref, that is, it is determined whether or not the driver has made the start-up request of the hybrid vehicle 20 (step S160). The accelerator operation amount deviation ΔAcc is a value that the accelerator operation amount Acc in the previous routine is subtracted from the accelerator operation amount Acc that is input in the step S100. When it is determined in the step S160 that the accelerator operation amount deviation ΔAcc is smaller than the reference deviation ΔAref and that the driver has not made the start-up request of the hybrid vehicle 20, the processes in the step S100 and after are executed after the processes in the aforementioned steps S190 to 5210 are executed.

On the other hand, when it is determined in the step S160 that the accelerator operation amount deviation ΔAcc is larger than or equal to the reference deviation ΔAref, it is further determined whether or not the brake flag Fdb, which is input in the step S100, is the value 1. That is, it is determined whether or not the frictional braking torque is applied to the wheels 39*a* and 39*b*, which are the drive wheels, by the brake unit 90. In the case that the brake flag Fdb is the value 1 and that the frictional braking torque is applied to the wheels 39*a* and 39*b*, which are the drive wheels, by the brake unit 90, a command signal is transmitted to the brake ECU 95 so that the application of the frictional braking torque to the wheels 39*a* and 39*b*, which are the drive wheels, is stopped (step S180). The brake ECU 95 that has received the command signal transmitted in the step S180 controls the brake actuator 92 so that the frictional braking torque is not applied to the wheels 39*a* and 39*b*. When it is determined false in the step S170, the process in the step S180 is omitted. Accordingly, after it is determined false in the step S170, or after the process in the step S180 has been executed, the frictional braking torque is only applied to the wheels 39*c* and 39*d*, which are the free rotational wheels, among the wheels 39*a* to 39*d* by the brake unit 90. After the process in the step S170 or S180, the processes in the aforementioned steps S190 to 5210 are executed. Then, the processes in the step S100 and after are repeated. When it is determined that the rotational speed Nm2 of the motor MG2 become larger than or equal to the reference rotational speed Nref in the step S110 after the repeated execution of the processes in the steps S100 to S210, a command signal is transmitted from the brake unit 90 to the brake ECU 95 so that the application of the frictional braking torque to the wheels 39*c* and 39*d* is stopped (step S220), and the routine is terminated. After the termination of the routine, a drive control routine for a motor drive mode (not shown) is executed to control the motor MG2 such that the motor MG2 outputs the torque based on the required torque Tr* within a range of the input and output limits Win and Wout of the battery 50, for example.

Figure 4:
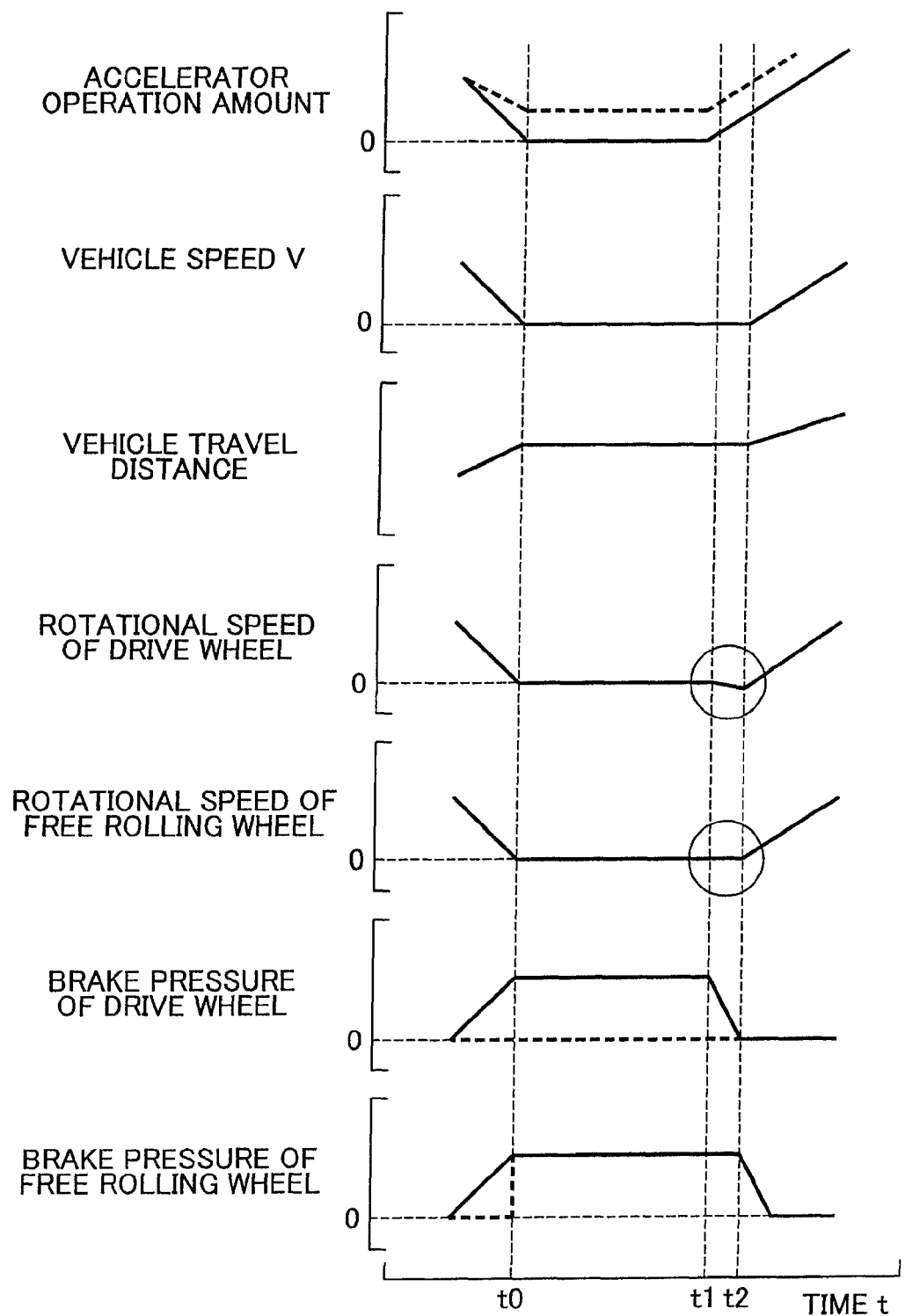
FIG. 4 is a time chart that shows changes with time in an accelerator operation amount, a vehicle speed V, a travel distance of the hybrid vehicle, rotational speed of a wheel, and wheel cylinder pressures of wheels that include a drive wheel and a free rolling wheel, when the drive control routine during a halt, which is shown in FIG. 2, is executed.

FIG. 4 is a time chart that shows changes with time in the accelerator operation amount, the vehicle speed V, a travel distance of the hybrid vehicle 20, the rotational speed of the wheels 39*a* to 39*d*, and wheel cylinder pressures (brake pressures) of the wheels 39*a* and 39*b*, which are the drive wheels, and the wheels 39*c* and 39*d*, which are the free rolling wheels, when the aforementioned drive control routine during a halt is executed. In FIG. 4, the solid lines represent changes in the accelerator operation amount Acc and the like when the hybrid vehicle 20 comes to a halt due to the operation of the brake pedal 85 by the driver, while the dotted lines represent changes in the accelerator operation amount Acc and the like when the hybrid vehicle 20 comes to a halt due to the acceleration hold. The time t0 in FIG. 4 is a time when the hybrid vehicle 20 comes to a halt. The time t1 in FIG. 4 is a time when it is determined that the start-up request is made by the driver who operates the accelerator pedal 83 (time when it is determined true in the step S160 in FIG. 2). The time t2 in FIG. 4 is a time when it is determined that the rotational speed Nm2 of the motor MG2 become equal to or larger than the rotational speed Nref (the time when it is determined false in the step S110 in FIG. 2).

As shown in FIG. 4, when the hybrid vehicle 20 comes to a halt on the uphill due to the operation of the brake pedal 85 by the driver, the application of the frictional braking force to the wheels 39*a* and 39*b*, which are the drive wheels, by the brake unit 90 is cancelled at the time t2 when it is determined that the driver has made the start-up request. Accordingly, from a relationship between the road surface inclination θ and the frictional braking torque that is applied only to the wheels 39*c* and 39*d*, which are the free rolling wheels, the rotation of the wheels 39*a* and 39*b* as the drive wheels due to uplift of the wheels that is caused by suspension stroke, or the rotation of the motor MG2, is permitted. Otherwise, the rotation of the wheels 39*a* and 39*b*, which are the drive wheels, by the rearward movement of the vehicle to a degree that does not give a sense of discomfort to passengers, or the rotation of the motor MG2, is permitted. Accordingly, even when the output torque of the motor MG2 is limited to be lower than or equal to the upper limit torque Tm2lim in order to prevent the overheat of the motor MG2 and the like, it is possible to further reduce a distance of the rearward movement of the vehicle and to cancel the locked state of the motor MG2. Thus, the motor MG2 can be controlled such that the torque based on the required torque Tr* is subsequently output from the motor MG2. Then, when it is determined at the time t2 that the rotational speed Nm2 of the motor MG2 become equal to or larger than the reference rotational speed Nref, the brake unit 90 cancels the application of the frictional braking force to the wheels 39*c* and 39*d*, which are the free rolling wheels. Thus, the hybrid vehicle 20 can start moving smoothly. Also, in the embodiment, in the case that the hybrid vehicle 20 comes to a halt on the uphill due to the acceleration hold, the frictional braking force is only applied to the wheels 39*c* and 39*d*, which are the free rolling wheels, by the brake unit 90 when it is determined that the vehicle is at a halt (steps S140 and S150 in FIG. 2). Then, when the accelerator pedal 83 is further operated by the driver, and thus it is determined that the start-up request is made (step S160), like the case that the hybrid vehicle 20 is brought to a halt on the uphill due to the operation of the brake pedal 85 by the driver, the motor MG2 is controlled to output torque that is lower than the upper limit torque Tm2lim in a state that the frictional braking torque is only applied to the wheels 39*c* and 39*d*, which are the free rolling wheels, by the brake unit 90 until the rotational speed of the motor MG2 reaches the reference rotational speed Nref. Accordingly, the locked state of the motor MG2 is cancelled.

As described so far, in the hybrid vehicle 20 of the embodiment, when the start-up request is made by the driver while the vehicle is at halt on the driving road surface whose inclination θ is larger than or equal to the reference inclination θref (step S160), the frictional braking torque is applied only to the wheels 39*c* and 39*d* that are free rolling wheels (the second wheels) by the brake unit 90. In addition, the brake unit 90 and the motor MG2 are controlled such that the output torque of the motor MG2 becomes equal to or lower than the upper limit torque Tm2lim until the rotational speed Nm2 of the motor MG2 reaches the reference rotational speed Nref (step S170 to S210). As described above, the frictional braking torque is applied only to the wheels 39c and 39d, which are the free rolling wheels, other than the wheels 39a and 39b (the first wheels), which are the drive wheels, when the vehicle starts moving forward on the uphill. Accordingly, it is possible to permit the rotation of the wheels 39a and 39b, which are the drive wheels, or the rotation of the motor MG2, while the hybrid vehicle 20 remains at a halt, or by the rearward movement of the vehicle 20 to a degree that does not give a sense of discomfort to the passengers. Therefore, even when the output torque of the motor MG2 is limited to be equal to or lower than the upper limit torque Tm2* in order to prevent the overheat of the motor MG2, it is possible to further reduce a distance of the rearward movement of the vehicle and to cancel the locked state of the motor MG2. Thus, the hybrid vehicle 20 can start moving smoothly.

In the hybrid vehicle 20 of the embodiment, the brake unit 90 is controlled such that the application of the frictional braking torque to the wheels 39c and 39d, which are the free rolling wheels, by the brake unit 90 is stopped when the rotational speed Nm2 of the motor MG2 reaches the reference rotational speed Nref. Thus, the hybrid vehicle 20 can start moving smoothly on the uphill. Furthermore, when the hybrid vehicle 20 comes to a halt on the driving road surface, whose inclination θ is larger than or equal to the reference inclination θref, without the breaking request by the driver, due to the acceleration hold, the brake unit 90 is controlled such that the frictional braking torque is applied to the wheels 39c and 39d, which are free rolling wheels, by the brake unit 90. As described above, the frictional braking force is applied to the wheels 39c and 39d in advance when the hybrid vehicle 20 comes to a halt on the uphill due to the acceleration hold. Accordingly, it is possible to preferably reduce a distance of the rearward movement of the hybrid vehicle 20 when the hybrid vehicle 20 starts moving.

Figure 5:
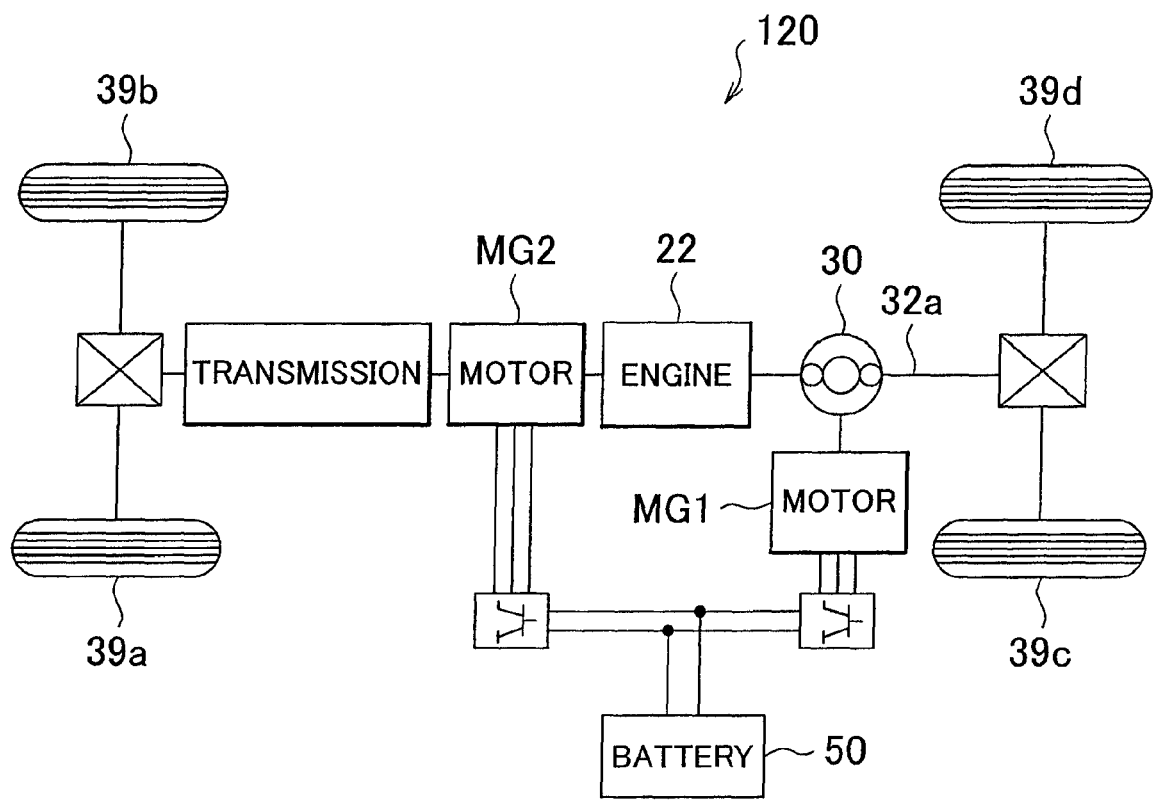
FIG. 5 shows general configuration of a hybrid vehicle 120 according to a modification of the embodiment of the present invention.

The above description is related to a case in which the hybrid vehicle 20, which remains at a halt on the uphill, starts moving forward. However, it is understood that the processes equivalent to those shown in FIG. 2 would be executed for the rearward movement of the vehicle on a downhill whose inclination θ as downward inclination is larger than or equal to a specified value. In addition, a state that the operation of the engine 22 is stopped is exemplified in the above description. However, it is understood that the processes as described above would be executed for the start-up of the hybrid vehicle 20 that has stopped on the slope road while the engine 22 is running. Furthermore, the hybrid vehicle 20 of the embodiment is a rear-wheel-drive vehicle. However, it is understood that the present invention can also be applied to a front-wheel drive vehicle. Like a hybrid vehicle 120 as a modification shown in FIG. 5, the present invention may be applied to a vehicle in which the power of the motor MG2 is output to an axle (the axle connected to the wheels 39a and 39b in FIG. 5) that differs from the axle connected to the ring gear shaft 32a (the axle connected with the wheels 39c and 39d). Furthermore, the present invention may be applied to an all-wheel-drive vehicle in which the power that is output to the ring gear shaft 32a is distributed to both the front and rear wheels through a power distribution mechanism such as a transfer (center differential). In this case, it is preferable to use the wheels with a higher proportion of power distribution as primary drive wheels. In addition, the present invention may be applied to the all-wheel-drive vehicle that further includes an electric motor that can output power to the wheels 39c and 39d, which are the free rolling wheels of the hybrid vehicle 20 of the embodiment. In this case, the wheels that are coupled to one among the motor MG2 or the electric motor that can output power to the wheels 39c and 39d that is used for start-up of the vehicle are used as the primary drive wheels. It is understood that the present invention can be applied to a battery vehicle (electrical powered vehicle). In the hybrid vehicle 20 of the embodiment, the ring gear shaft 32a and the motor MG2 are coupled through the reduction gear 35. However, instead of the reduction gear 35, a transmission may be adopted. The transmission changes the rotational speed of the motor MG2 that has two gears of Hi and Lo, or three or more gears, and transmits the power to the ring gear shaft 32a.

Here, corresponding relationships between the above embodiment and main elements of the modification, and the main elements of the present invention that is described in the Summary of the Present Invention will be described. In the above embodiment and modification, the motor MG2 that can output power to the ring gear 32a that is coupled to the wheels 39a and 39b as the first wheels corresponds to an example of the "electric motor". The battery 50 that can exchange electrical power with the motor MG2 corresponds to an example of the "electrical storage device". The brake unit 90 that can independently apply the frictional braking torque to the wheels 39a and 39b as well as to the wheels 39c and 39d as the second wheels irrespective of the braking request by the driver corresponds to an example of the "braking system". The inclination sensor 88 that can detect the road surface inclination θ corresponds to an example of the "inclination acquisition device". A combination of the hybrid ECU 70, the motor ECU 40, and the brake ECU 95 that execute the drive control routine during stop in FIG. 2 corresponds to an example of the "control unit". The engine 22 corresponds to an example of the "internal combustion engine". The motor MG1 corresponds to an example of the "second electric motor". The power distribution/integration mechanism 30 that is a planetary gear mechanism and includes: the sun gear 31 connected to the motor MG1; the carrier 34 connected to the crankshaft 26 of the engine 22; and the ring gear 32 connected to the ring gear shaft 32a corresponds to an example of the "triaxial power input/output device".

It should be noted that the "electric motor" is not limited to a synchronous generator-motor such as the motor MG2 and can be of any type including an induction motor as long as it can output power to the drive shaft that is coupled to the first wheels, which are the primary drive wheels. The "electrical storage device" is not limited to a secondary battery such as the battery 50 and can be of any type including a capacitor. The "braking system" can be of any type other than electronically-controlled hydraulic brake unit 90 as long as it can independently apply the braking force to the first wheels and the second wheels that are the free rolling wheels or the drive wheels other than the first wheels, irrespective of the braking request by the driver. The "inclination acquisition device" can be of any type as long as it can acquire inclination of a driving road surface. For example, the "inclination acquisition device" may estimate the road surface inclination based on the drive force acting on the vehicle and the acceleration of the vehicle. The "control unit" can be of any type other than the combination of the hybrid ECU 70, the motor ECU 40, and the brake ECU 95, which is a single electronic control unit as long as the "control unit" controls the braking system and the electric motor such that the braking force is only applied to the second wheels by the braking system and that the output torque of the electric motor is equal to or lower than the specified torque when the start-up request is made by the driver while the vehicle is at a halt on the driving road surface whose inclination is larger than or equal to the specified inclination. The "internal combustion engine" is not limited to the engine 22 that receives supply of hydrocarbon fuel such as gasoline and diesel fuel to output power and can be of any type including a hydrogen engine. The "second electric motor" is not limited to a synchronous generator-motor such as the motor MG1 and can be of any type including an induction motor. The "triaxial power input/output device" is not limited to the power distribution/integration mechanism 30 and can be of any type including a planetary gear mechanism of a double pinion type and a differential gear as long as the "triaxial power input/output device" is connected to three shafts that are the output shaft of the internal combustion engine, the rotational shaft of the second electric motor, and the drive shaft, and, on the basis of power input/output to two of the three shafts, inputs/outputs power to the remaining shaft. It should be understood that the embodiment is merely a specific example of the present invention.

While the embodiment of the present invention has been described, the present invention is not limited to the embodiment and can be implemented in various forms without departing from the scope of the present invention.

The present invention can be utilized in a manufacturing industry of vehicles and the like.

What is claimed is:

1. A vehicle comprising:
    an electric motor that outputs power to a drive shaft that is coupled to a first wheel, which is a primary drive wheel;
    an electrical storage device that exchanges electrical power with the electric motor;
    a braking system that can independently apply a braking force to the first wheel and a second wheel that is a free rolling wheel or a drive wheel other than the first wheel, regardless of a braking request by a driver;
    an inclination acquisition device that acquires inclination of a driving road surface; and
    a control unit that controls the braking system and the electric motor such that the braking system applies the braking force only to the second wheel and that output torque of the electric motor becomes equal to or lower than specified torque until rotational speed of the electric motor reaches specified rotational speed when a start-up request is made by the driver while the vehicle is at a halt on the driving surface road whose inclination, which is acquired by the inclination acquisition device, is larger than or equal to specified inclination.

2. The vehicle according to claim 1, wherein
    the specified torque is a value that is equal to or lower than maximum torque that can be output from the electric motor when rotation of the electric motor is stopped.

3. The vehicle according to claim 1, wherein
    the control unit controls the braking system such that the braking system stops applying the braking force to the second wheel when the rotational speed of the electric motor reaches the specified rotational speed.

4. The vehicle according to claim 1, wherein
    the control unit controls the braking system such that the braking system applies the braking force to the second wheel when the vehicle comes to a halt without a braking request by the driver, on the driving road surface whose inclination, which is acquired by the inclination acquisition device, is equal to or larger than the specified inclination.

5. The vehicle according to claim 1, further comprising:
    an internal combustion engine that outputs power;
    a second electric motor that can input and output power and exchange electrical power with the electrical storage device; and
    a triaxial power input/output device that is connected to three shafts including the drive shaft, an output shaft of the internal combustion engine, and a rotational shaft of the second electric motor, and based on power that is input to or output from any two of the three shafts, inputs or outputs power to/from a remaining shaft.

6. A control method of a vehicle that includes: an electric motor that can output power to a drive shaft that is coupled to a first wheel, which is a primary drive wheel; a electrical storage device that can exchange electric power with the electric motor; and a braking system that can independently apply a braking force to the first wheel and a second wheel that is a free rolling wheel or a drive wheel other than the first wheel, regardless of a braking request by a driver, the control method of a vehicle comprising:
    controlling the braking system and the electric motor such that the braking system applies the braking force only to the second wheel and that output torque of the electric motor becomes equal to or lower than specified torque until rotational speed of the electric motor reaches specified rotational speed when a start-up request is made by the driver while the vehicle is at a halt on a driving surface road whose inclination is larger than or equal to specified inclination.

7. The method according to claim 6, wherein
    the specified torque is a value that is equal to or lower than maximum torque that can be output from the electric motor when rotation of the electric motor is stopped.

8. The method according to claim 6, further comprising:
    controlling the braking system such that the braking system stops applying the braking force to the second wheel when the rotational speed of the electric motor reaches the specified rotational speed.

9. The method according to claim 6, further comprising:
    controlling the braking system such that the braking system applies the braking force to the second wheel when the vehicle comes to a halt, without the braking request by the driver, on a driving road surface whose inclination, which is acquired by an inclination acquisition device, is equal to or larger than the specified inclination.

* * * * *

UNITED STATES PATENT AND TRADEMARK OFFICE
CERTIFICATE OF CORRECTION

PATENT NO. : 8,275,503 B2
APPLICATION NO. : 12/615053
DATED : September 25, 2012
INVENTOR(S) : Kazunari Izumi It is certified that error appears in the above-identified patent and that said Letters Patent is hereby corrected as shown below:

Column 2, line 48, change "it is :" to --it is possible--;

Column 5, line 29, change "from an current" to --from a current--;

Column 6, line 10, change "to an distributed" to --to a distributed--;

Column 7, line 53, change "step 5110" to --step S110--;

Column 8, line 7, change "step 5120" to --step S120--;

Column 9, line 18, change "to 5210" to --to S210--.

Signed and Sealed this
Fifth Day of March, 2013

Teresa Stanek Rea
*Acting Director of the United States Patent and Trademark Office*